US008521719B1

(12) United States Patent
Acharya et al.

(10) Patent No.: US 8,521,719 B1
(45) Date of Patent: Aug. 27, 2013

(54) SEARCHABLE AND SIZE-CONSTRAINED LOCAL LOG REPOSITORIES FOR TRACKING VISITORS' ACCESS TO WEB CONTENT

(71) Applicant: Limelight Networks, Inc., Tempe, AZ (US)

(72) Inventors: Soam Acharya, San Bruno, CA (US); Paul Cho, Emeryville, CA (US); Jonathan Cornwell, Seattle, WA (US); Chris Kwok, Seattle, WA (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 13/648,956

(22) Filed: Oct. 10, 2012

(51) Int. Cl.
*G06F 7/02* (2006.01)
*G06F 17/30* (2006.01)

(52) U.S. Cl.
USPC ............ 707/711; 707/740; 707/741; 707/746

(58) Field of Classification Search
None
See application file for complete search history.

(56) References Cited

U.S. PATENT DOCUMENTS

| | | | |
|---|---|---|---|
| 6,115,035 A | 9/2000 | Compton et al. | |
| 6,757,740 B1 | 6/2004 | Parekh et al. | |
| 7,281,260 B2 | 10/2007 | Puente et al. | |
| 2005/0198006 A1 | 9/2005 | Boicey et al. | |
| 2008/0086453 A1 | 4/2008 | Fabian | |
| 2008/0120290 A1 | 5/2008 | Delgo et al. | |
| 2008/0276179 A1* | 11/2008 | Borenstein et al. | 715/736 |
| 2009/0210395 A1 | 8/2009 | Sedam | |
| 2009/0222442 A1 | 9/2009 | Houh et al. | |
| 2011/0282879 A1 | 11/2011 | Bargeron et al. | |

OTHER PUBLICATIONS

SOLUTIONS4SME, "Privacy Statement", Retrieved on Nov. 17, 2012 from http://www.solutions4sme.com/privacy_statement.html, p. 1-3.
Proquest, "Privacy Policy", Retrieved on Nov. 17, 2012 from http://www.proquest.co.uk/en-UK/site/privacy.shtml, p. 1-6.
BIOAWARE SA NV, "Biolomics Software & Services", Retrieved on Nov. 17, 2012 from http://www.bio-aware.com/Documents/BioloMICSDoc.pdf, Nov. 2010, p. 1-12.
SOCMA, "SOCMA Website Privacy Policy", Retrieved on Nov. 17, 2012 from http://www.socma.com/terms/?articleid?475, p. 1-2.

* cited by examiner

*Primary Examiner* — Bruce Moser
(74) *Attorney, Agent, or Firm* — Kilpatrick Townsend & Stockton LLP

(57) ABSTRACT

A method and system for tracking visitors' access to web content using a searchable and size-constrained local log repository is disclosed. A repository indexer receives visitor logs from a remote source and indexes the logs to include a usage field indicating when or how frequently an associated visitor log was accessed from a local log repository by a report request manager. The local log repository stores the logs and is size constrained. A repository manager removes a subset of the logs in the local log repository based on parameters within the subset of the logs' usage field. The report request manager receives a request from a requestor for a report indicating visitors' access to a content object, searches for logs within the local log repository pertinent to the request, aggregates data across the logs responsive to the search, and generates a report presenting the aggregated data.

20 Claims, 17 Drawing Sheets

SEARCHABLE AND SIZE-CONSTRAINED LOCAL LOG REPOSITORIES FOR TRACKING VISITORS' ACCESS TO WEB CONTENT

BACKGROUND

This disclosure relates in general to repeated and differential quantification pertaining to web-site access. Specifically, contributions of initial quantifications can be indexed, locally stored and selectively used for subsequent quantifications.

Content providers can provide many different types of content. Meanwhile, it can be difficult to determine whether it is advantageous for the content provider to provide content with a first set of characteristics versus content with other characteristics. For example, the provider may be faced with a decision about what type of information to include in the content (e.g., News Story A versus News Story B), what format to use for the content (e.g., text versus video), or how many advertisements to include in or around the content. The content provider may be considering a number of different factors (e.g., contracts or distribution expense), but frequently, a key issue is which content characteristics will attract and retain a large number of viewers.

Various web services track when a visitor views a particular piece of content. A content provider may be interested to view statistics about the views. However, determining a technique to practically aggregate the visitor data in a meaningful manner can be difficult.

SUMMARY

In one embodiment, the present disclosure provides a method and system for locally aggregating and indexing visitor data in a local log repository, such that the data can be repeatedly used to generate different visitor statistics. Web servers hosting content objects can collect access data following visitors' requests to access specific content objects. The visitor data can include, e.g., a request, a request time, a visitor's estimated location, a user device making the request, a user agent associated with the request, a request status (e.g., completed or failed), and/or a page-view time. Each web server can periodically push the access data to a central server. A web provider can request a first report summarizing specific access data (e.g., views of Content X separated by visitors' estimated geographical region, views of Content X separated by user devices used by visitors, or views of Context X for each day within the past week). A report server handling the request can request a subset of the data stored at the central server from the central server. The report server can index the received data and store it in a local log repository. A same or different web provider can then request a second report summarizing different access data. Based on the indexing, the report server can identify locally stored data applicable for the second report. The report server can therefore reduce or eliminate the visitor data that it requests from the central server. This capability can reduce response time, as collecting data directly from the central server can result in delays due to a network round-trip time for requesting and receiving the data and due to a delay in the central server's time to itself process the request. This capability can further reduce cost, as gathering data from a central server is frequently billed (e.g., per request).

A difficulty with locally storing report-contributing data is that a local log repository can be subject to size constraints. Further, while it is advantageous to include indexing fields to allow for future reports to draw upon the same data, the indexing fields themselves contribute to the consumed portion of the repository. To mitigate this problem, the local log repository can be repeatedly pruned. For example, at regular intervals or when the local log repository approaches a size threshold, data that is or is likely to be infrequently used to generate reports can be removed from the local log repository. In order to assess current use properties or predicted future use properties, an additional indexing field can be associated with the stored data that tracks the usage of the data. Though the usage-tracking indexing field will itself consume space, it can actually increase the utility of the repository by allowing the most utilized data to remain in a local log repository such that it is easily accessible for report generation.

Further, the usage-tracking indexing field can allow the report server to predict which data it will use for future reports. For example, the report server can determine that reports are frequently requested for each of Contents X-Z to show the number of content visits within the last week, separated by geographic location. Though locally stored data can contribute to this report, the report server will also need to frequently receive recent data to capture visits within a recent time period. Rather than waiting to receive a report request to receive the recent data, the report server can request appropriate visitor data from the central server even before a report request is received (e.g., every few hours). This practice can reduce a time required to respond to a report request.

In some embodiments, a system for tracking visitors' access to web content using a searchable and size-constrained local log repository is provided. A repository indexer receives visitor logs from a remote source and indexes the received visitor logs to include a usage field. Each visitor log indicates a content object requested by a visitor and a date. The usage field indicates when or how frequently an associated visitor log was accessed from a local log repository by a report request manager. The local log repository stores the visitor logs received and indexed by the repository indexer. The local log repository is size constrained. A repository manager removes a subset of the visitor logs in the local log repository based on parameters within the subset of the visitor logs' usage field. The report request manager receives a request from a requestor for a report indicating visitors' access to a content object and searches for visitor logs within the local log repository pertinent to the request. The report request manager further aggregates data across the visitor logs responsive to the search and generates a report presenting the aggregated data.

In some embodiments, a method for tracking visitors' access to web content using a searchable and size-constrained local log repository is provided. Visitor logs are received from a remote source. Each visitor log indicates a content object accessed by a visitor and a date. The received visitor logs are indexed to include a usage field. The usage field indicates when or how frequently an associated visitor log was accessed from a local log repository. The indexed visitor logs are stored in the local log repository, the local log repository being size constrained. A request is received from a requestor for a report indicating visitors' access to a content object. A search is performed for visitor logs within the local log repository to the request. Data is aggregated across the visitor logs responsive to the search. Parameters within the usage field of the visitor logs are updated responsive to the search to indicate that the logs were accessed. A report presenting the aggregated data is generated. A subset of the visitor logs in the local log repository is removed based on parameters within the subset of the visitor logs' usage field.

In some embodiments, a method for tracking visitors' access to web content using a searchable and size-constrained local log repository is provided. Visitor logs are received from a remote source, each visitor log indicating a content object accessed by a visitor and a date. The received visitor logs are updated to add, remove or modify a field of the visitor logs. The indexed visitor logs are stored in a local log repository, the local log repository being size-constrained. A request is received from a requestor for a report indicating visitors' access to a content object. A search is performed for visitor logs within the local log repository pertinent to the request. Data is aggregated across the visitor logs responsive to the search. A report presenting the aggregated data is generated. A subset of the visitor logs in the local log repository is removed.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

In the appended figures, similar components and/or features may have the same reference label. Where the reference label is used in the specification, the description is applicable to any one of the similar components having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1A:
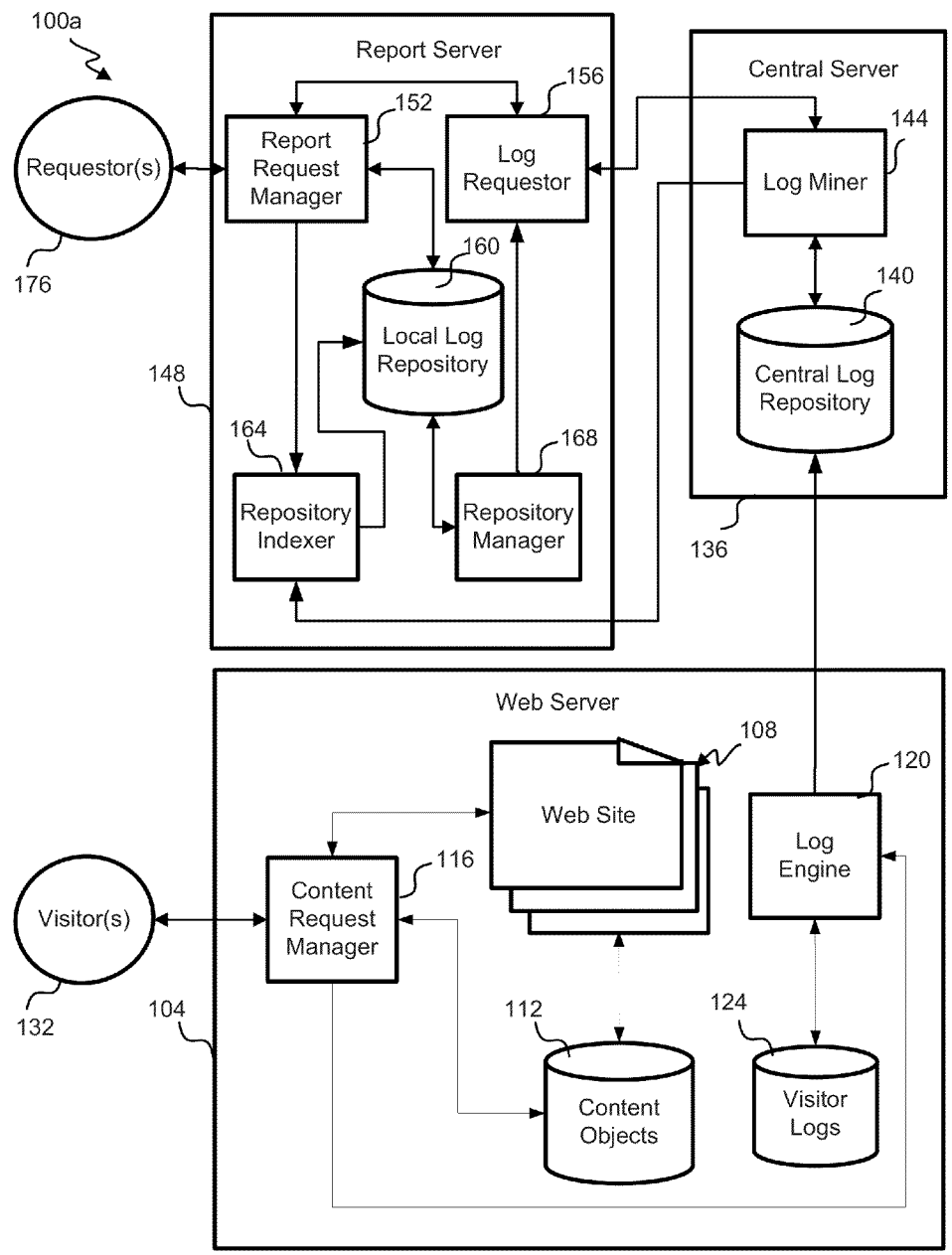
FIGS. 1A-1B depict a block diagram of embodiments of a visitor-tracking system.

Referring first to FIG. 1A, a block diagram of an embodiment of a visitor-tracking system 100*a* is shown. Visitors 132 request and receive content from a web server 104. The content can include a content file or content stream and could include, for example, video, pictures, data, audio, software, and/or text. The content could be live, delayed or stored. Throughout the specification, references may be made to a content object, content, content stream and/or content file, but it is to be understood that those terms could be used interchangeably wherever they may appear.

The web server 104 provides web sites 108 and/or content objects 112, which may be presented via the web sites 108. For example, an image can be visually presented on a web page, a video and/or audio track can be presented on a web page, or a file can be downloaded to a visitor's user device by selecting an option (e.g., clicking on a link) on a web page. In some instances, a web page itself is a content object 108.

In some instances, a single web server 104 hosts a web site 108 and content objects 112 accessible via the web site 108. In some instances, multiple web servers 104 are involved (e.g., one hosting the web site 108 and one or more hosting content objects 112 accessible via the web site 108). The web server 104 includes a content request manager 116, which can receive requests from a user device of a visitor 132. The request can include an HTTP request and/or can specify a uniform resource identifier. The request can also specify a visitor's IP address, a date and time of the request, a user agent (e.g., a browser or client software) making the request, a user device, and/or a user name associated with the visitor (e.g., based on a visitor's authenticated login or local information). Upon receiving the request, the content request manager 116 attempts to identify the requested content. If it is available and, in some instances, if it accessible to the requesting visitor 132 (e.g., based upon an authenticated log-in name), the content request manager 116 responds to the request with the requested content. Otherwise, the content request manager 116 responds to the request with a failure indication.

The web server 104 includes or otherwise is coupled to a log engine 120. The content request manager 116 transmits received requests to the log engine 120, and the log engine 120 extracts information from the request and stores the information as a visitor log in a visitor-log database 124. For example, one, more or each visitor log can include a network identification of a device associated with a requesting visitor 132 (e.g., a hostname or IP address), a user device associated with a requesting visitor 132 (e.g., an Android Smartphone, iPhone, laptop computer or desktop computer), an identification of the visitor 132 (e.g., the visitor's name as stored on the device associated with the visitor or an authenticated login name), a date and time of the request, what is being requested (e.g., a content identifier), response properties (e.g., whether the requested content was delivered or a size of delivered content), and/or a user agent (e.g., a name and version of a browser or software used to make the request). Thus, one, more or each log can have a parameter associated with one or more of these fields. The log engine 120 can further consult an internal or external database to determine a geographical location of the visitor (e.g., based on the visitor's IP address) and store the geographical location (e.g., a city, state, country, street address and/or coordinates) within the visitor log 124. In some instances, a single log is generated for each content request.

The web server 104 transmits the visitor logs to a central server 136. The web server 104 may be in a different geographical location than the central server 136. For example, the web server 104 and the central server 136 can each be located within different points of presence within a content delivery network. The central server 136 can be coupled to one or more web servers 104. The visitor logs can be transmitted, e.g., at regular intervals, once a threshold number of new visitor logs have been generated, or in response to a pull from the central server 136 (e.g., responsive to a report request). The transmitted logs can include all logs, all logs not previously transmitted to the central server, a subset of all of the logs (e.g., those pertaining to a specific content object), a subset of all of the logs not previously transmitted to the central server, etc. The central server 136 stores the visitor logs in a central log repository 138.

Requestors 176 request a report regarding visitor data from a report server 148. The report server 148 may be in a different geographical location than the central server 136 and/or than the web server 104. For example, the report server 148, the web server 104 and the central server 136 can each be located within a different point of presence within a content delivery network. The request for the report can include an identification of one or more specific content items (e.g., based on a content identifier or name), a content property (e.g., having "WWII" in its name), a content source or provider, a content format (e.g., video, graphic or HTML), fields of interest, field-parameter restrictions and/or field-parameter discretization. For example, a requestor 176 may request a report for data about how many visitors were successfully provided with Content X within the last week discretized by the location of the visitors or discretized by user agents associated with the visitors.

The request is handled by a report request manager 152, which receives and responds to the request. The report request manager 152 first determines the visitor data needed to prepare the requested report. In some instances, this involves consulting an internal or external content-information database (e.g., associating content objects with content sources or types). In some instances, the report request manager 152 uses an ontology (which can include weighted or unweighted relationships between words and/or phrase) in order to identify content objects of interest to the requestor. For example, a content keyword can be expanded to include additional related words. In these instances, the report request manager 152 may later weight visitor data depending on the relationship between words associated with the visitor data and the input content keyword.

The report request manager 152 then determines whether any of the required visitor data is available within a local log repository 160. If so, the report request manager 152 collects the appropriate visitor logs (e.g., including the visitor data) from the local log repository 160. The report request manager 152 also determines whether any of the required visitor data is not available within the local log repository 160. If any of the required visitor data is not available within the local log repository 160, then a log requestor 156 transmits a request for logs including the visitor data to the central server 136. At the central server 136, a log miner 144 collects the appropriate visitor logs (e.g., by searching through field parameters) from the central log repository 140 and returns the collected visitor logs to the log requestor 156, which provides the visitor logs to the report request manager 152.

The report request manager 152 then aggregates data within the logs to conform with the request from the requestor 176. The report request manager 152 provides a report with the aggregated data to the requestor 176. The report can be provided by electronically transmitting a file to the requestor such that the requestor 176 downloads the report to his user device or by presenting the report over a network (e.g., within a webpage).

The report can be static (e.g., a pdf file) or dynamic (e.g., adjusting presented data in response to the requestor's interaction with the report). For example, a requestor 176 may be able to adjust a field-parameter discretization and a presented report can be automatically adjusted to present the appropriate discretization (which may involve re-aggregating the visitor data). In some instances, a requestor 176 can adjust data-linked information presented in the report only in manners not requiring the log requestor 156 to request additional visitor data from the central server 136 (e.g., the adjustment being handled by dynamic aggregation performed locally at the report server 148 by the report request manager 152) and/or to collect additional visitor data from the local log repository 160. In some instances, a requestor 176 can adjust data-linked information presented in the report to include data not in current aggregations (e.g., to extend a date range of interest), in which case the log requestor 156 can request additional visitor data from the central server 136 and/or the report request manager 152 can collect additional data from the local log repository 160.

The visitor logs received from the central server 136 responsive to requests for visitor data from the log requestor 156 are also used to populate the local log repository 160. The received visitor data can be simultaneously routed to a repository indexer 164. The repository indexer 164 can determine what fields to keep, delete or add to each visitor log (e.g., adding a field indicating a date that the visitor log was added to the local log repository 160). The decision about which fields to keep, delete or add can be based on fields that may be applicable for reports or based on a frequency of use for reports. For example, the report request manager 152 can allow a requestor to limit parameters for a visitor date field but not for a user-name field. Thus, the repository indexer 164 can delete the user-name field from the logs. As another example, a user-agent field can be deleted if it is determined that requestors 176 infrequently restrict associated parameters or request discretization of the parameters. The repository indexer 164 can make a determination about appropriate fields once, at regular intervals or for each individual or group of visitor logs to be added to the local log repository 160. In instances in which the determination is not made for every log stored, the repository indexer 164 can store the determination. The repository indexer 164 can adjust the received visitor logs to include the appropriate fields and store the visitor logs within the local log repository 160. It is therefore apparent that logs stored in the local log repository 160 need not be of a same format as logs stored in the central log repository 140 and/or the visitor-log database 124. Similarly, logs stored in the central log repository 140 need not be of a same format as logs stored in the visitor-log database 124.

One or more of the fields of the visitor logs stored in the local log repository 160 can be a usage field. The usage field can indicate a count of how many times the visitor log was used for a report, a frequency of user of the visitor log for a report, a date and/or time (e.g., a most recent date and/or time or the last 5 dates and/or times) of using the visitor log for a report, a number of requestors 176 requesting reports using the visitor log. Thus, when a request is received, the report request manager 152 can identify visitor logs that it will collect, is collecting or collected from the local log repository 160 to the repository indexer 164. The repository indexer 164 can then update parameters within the appropriate usage fields to indicate the usage.

A repository manager 168 monitors and manages the local log repository 160. The repository manager 168 can monitor a size of the local log repository 160. If the size is approaching or exceeds a threshold, the repository manager 168 can prune the local log repository 160 to remove select visitor logs or the local log repository 160 can be pruned when criteria are met (e.g., detection that one or more usage parameters have fallen below a threshold, detection that a routine pruning interval has passed, etc.). The repository manager 168 can determine which visitor logs to remove based on usage data (e.g., removing the least used visitor logs or those not used for a longest time period), repository-addition dates (e.g., removing visitor logs added to the local log repository longest ago), visitor dates (e.g., removing visitor logs identifying visits to content that occurred longest ago), and/or requestor-related properties (e.g., removing logs associated with requestors receiving a low quality-of-service level before removing comparable logs associated with requestors paying for high quality-of-service levels). The determination can be based on absolute thresholds (e.g., removing all logs used less than 3 times and having been present in the local log repository 160 for at least 1 month) and/or on relative thresholds (e.g., removing the logs that, amongst all logs having been in the local log repository 160 for at least 1 month, were in the bottom 5% regarding usage counts).

In some instances, the repository manager 168 predicts future usage of visitor logs. The repository manager 168 can predict the usage by identifying usage trends. For example, the repository manager 168 can determine that a requestor 176 is sequentially requesting visitor data with regard to visiting data tied to each state in the United States. The repository manager 168 can also predict the usage by identifying trends about when visiting logs were added to the local log repository 160. For example, if the local log repository is updated approximately once an hour to include recent visitor data with regard to Content X, the repository manager 168 can predict that requestors will continue to request reports utilizing recent visitor data. After the content manager 168 predicts future usage of visitor logs, it can instruct the log requestor 156 to request visitor logs predicted to be used in the near future. Thus, the repository manager 168 can control both the removal and the addition of visitor logs to the local log repository 168.

It will be appreciate that, though FIG. 1A shows a single web server 104 and a single report server 148, a system can include or interact with a set of web servers 104 and/or a set of report servers 148. Further, though the web server 104, the central server 136 and the report server 148 are each portrayed as single entities, in some instances, multiple devices (e.g., computers or processors) support a single web server 104, a single central server 136 and/or a single report server 148.

Figure 1B:
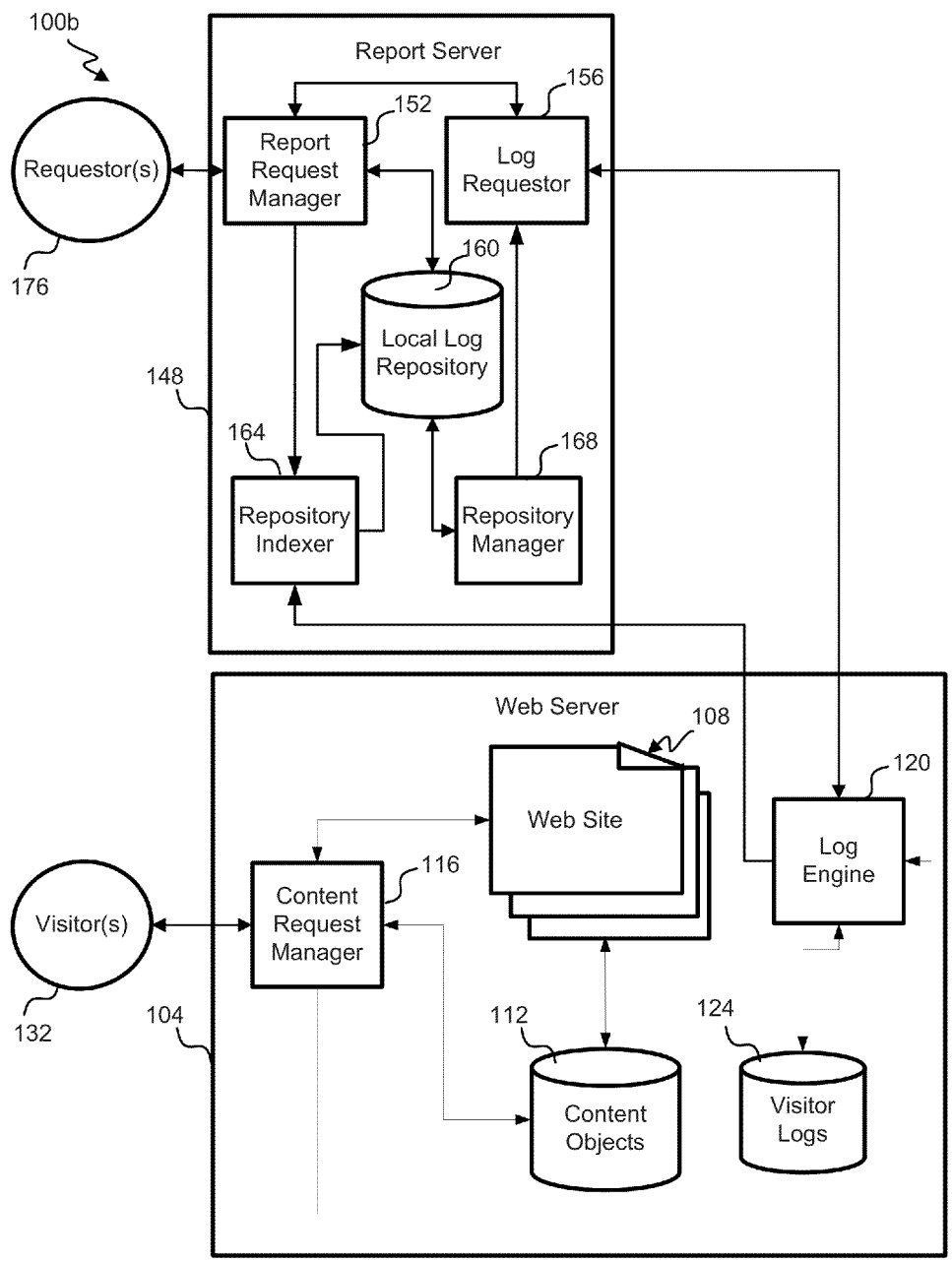

Referring next to FIG. 1B, a block diagram of an embodiment of another visitor-tracking system 100b is shown. Many features of the system 100b parallel those in the system 100a. However, the system 100b does not include a central server 136. Rather, the web server 104 communicates directly with the reporting server 148. Thus, the log engine 120 can transmit visitor logs to the report server 148. In some instances, the log engine 120 periodically (e.g., once every week, day, hour or minute) sends all or some logs not previously transmitted to the repository indexer 164, which identifies appropriate indices for the logs and stores them in the local log repository 160. In some instances, the log engine 120 transmits logs to the log requestor 156 (e.g., and repository indexer 164) in response to a request for the log (e.g., to generate a specific report in based on a prediction that the log will soon be used).

Figure 2:
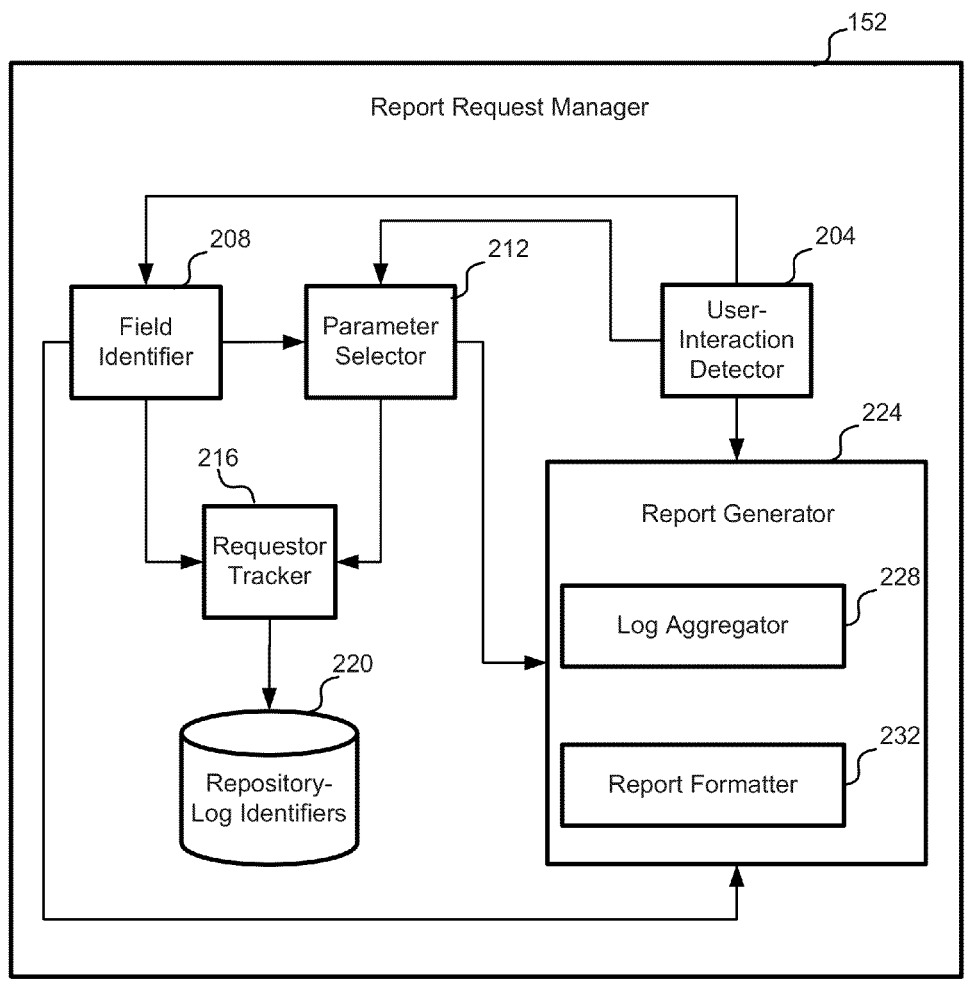
FIG. 2 depicts a block diagram of an embodiment of a report request manager.

Referring next to FIG. 2, a block diagram of an embodiment of a report request manager 152 is shown. The report request manager 152 includes a user-interaction detector 204 that detects a report request received from a requestor 172. The user-interaction detector 204 can further detect specific request features, such as which content object(s) the requestor 172 would like the request to relate to and fields of interest.

The user-interaction detector 204 transmits the detected information to a field identifier 208 and a parameter selector 212. The field identifier identifies fields within logs to be searched. For example, if the user-interaction detector 204 does not detect any request-related feature pertaining to date restrictions, the field identifier 208 can determine that a date field in the logs need not be searched (e.g., such that appropriate logs are identified regardless of associated dates).

Once the field identifier 208 identifies which fields to search, the parameter selector 212 identifies how to search those fields. For example, the parameter selector 212 can identify a content-object identifier to search for in a content field, a minimum view time to search for in a view-time field, or a list of user devices to search for in a user-device field. The parameter selector 212 can identify a range of parameters (e.g., context x1-x2), a list of parameters, a criterion (e.g., an upper and/or lower threshold), or a single parameter.

The identified fields and parameters can prepare the report request manager 152 to collect appropriate logs to respond to a report request. However, the report request manager 152 can also determine from where to request the reports from. Some logs satisfying the field and parameter restrictions can be stored in the local log repository 160, while others can be in a remote database (e.g., central log repository 140 or visitor logs database 124). In some instances, the report request manager 152 can first search the local log repository 160 and subsequently search the remote database. However, because the report request manager 152 may be unaware of the complete set of logs available locally and remotely, it can be difficult to determine how to efficiently formulate a remote request. Searching for all remote logs that meet the field and parameter restrictions can unnecessarily delay response time and increase costs.

Thus, in some embodiments, the report request manager 152 includes a request tracker 216 that tracks requests made to remote databases. The requestor tracker 216 can update a repository-log identifiers database 220 to indicate the requests made. It can be assumed that if a request was made for logs meeting a criterion, that the local log repository 160 is subsequently populated with those logs. In some instances, the requestor tracker 216 considers other conditions. For example, the requestor tracker 216 can refrain from updating the repository-log identifiers database 220 until multiple requests have been made using an overlapping criterion (e.g., if a first search was for Content A, iPhone devices and a second search was for Content A, all devices, the requestor tracker 216 can update the repository-log identifiers database 220 to include Content A, iPhone devices upon receiving the second search given the multiple searches for that criterion).

Though not shown, the repository-log identifiers database 220 can be coupled to repository manager 168, such that the database is updated when logs are removed. For example, the repository-log identifiers database 220 can include a listing that indicates that the local log repository 160 includes logs meeting the criteria: Content A-C and dates: January 2010-January 2011. The repository manager 168 can then indicate that a log associated with Content B and a date of Apr. 4, 2010 was removed. Either the entire categorical log identifier could then be eliminated from the repository-log identifiers database 220 or a notation could be provided that this particular log is not included in the local log repository 160.

Using the stored repository-log identifiers, the report request manager 152 can determine which searches to perform in the local log repository 160 and which requests to make to a remote storage (e.g., via the log requestor 156). The collected logs can be handled by a report generator 224 that generates a report based on the logs. The report generator 224 can include a log aggregator 228 that aggregates log database based on report-request features. For example, the log aggregator 228 can count all collected logs that meet one or more criteria (e.g., Content A requested, Content A successfully provided, iPhone device, and viewer watched entire movie of Content A). In some instances, the log aggregator 228 counts the collected logs that meet each of a plurality of criterion or a criteria set. For example, a user can request a report indicating viewers that requested Content A-B, on dates Nov. 1, 2012-Nov. 14, 2012, discretized by the content and the request day. Thus, the log aggregator 228 can perform 28 counts. In some instances, the log aggregator calculates a percentage, such as percentage of views within a date range on each day within the date range, or a percentage of requests for a content object in which the viewer watched various portions of the content object.

The aggregated log data can then be formatted by a report formatter 232 to produce a report. The report can include text and/or graphics. The report can be static or dynamic, such that a user can interact with the report in a manner such that the presented information depends on the user interaction. For dynamic reports, the report generator 224 can repeatedly generate a presented report based on user input detected by the user-interaction detector 204. For example, a report can initially show the number of views of a content object per country. A user can then request information with higher geographical precision, e.g., by zooming into a graphical presentation of the data or selecting a precision point along a scale. The log aggregator 228 can then re-aggregate the data and the report formatter 232 can reformat a presented report accordingly. Because the logs are locally available, the reports can be dynamically adjusted locally without needing to call on remote sources to, e.g., count logs meeting a new criterion.

Figure 3A:
FIGS. 3A-3D illustrate dynamic reports generated by a report request manager.

Referring next to FIGS. 3A-3D, examples of presentations of a dynamic report generated by report request manager 152 are shown. In this instance, the data is discretized based on geographic location. In FIG. 3A, a number of views of a content object, discretized by country, is presented. The data is represented both via map-based graphics and text. In the top, map-based graphics section of the report, a shading of a country is indicative of the number of views, with darker green indicating more views and lighter green indicating fewer views. In the depicted instances, the content object was viewed more by visitors in the United States than by visitors in any other individual country.

The bottom, text-based section of the report shows absolute views and views per country as a percentage of total views. Thus, the views by United States visitors constituted 73% of the total views of the content object.

To present this data, the report request manager 152 can collect all logs for the given content object. The log aggregator 228 can then group the logs based on a country identified in the log.

Figure 3B:

A viewer can interact with the report by adjusting a zoom scale on the left of the map-based graphics section or by clicking on a particular country. FIG. 3B illustrates a report presented after a user clicks on the United States in the report presented in FIG. 3A. At this point, rather than views being discretized at a country level, it's discretized at a state level. Again, the report shows a graphical and textual representation of the state-specific views. In this instance, Washington was associated with more views than any other state.

To modify the report from that shown in FIG. 3A to that shown in FIG. 3B, the log aggregator 228 can identify the logs previously collected with the United States being identified as a country. The log aggregator 228 can then group the data based on a state identified in the log.

Figure 3C:
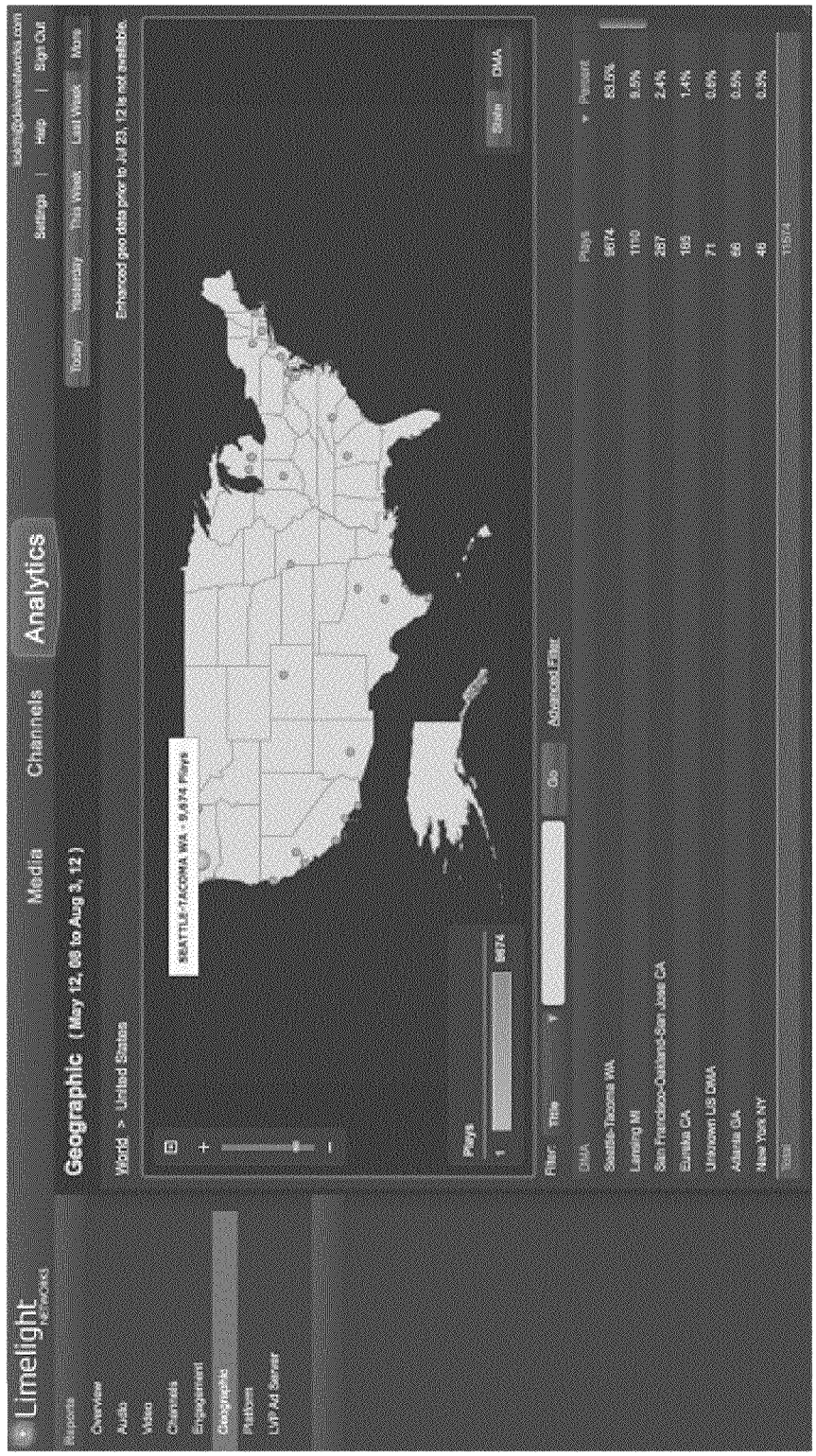

A viewer can further interact with the presented report to again adjust the aggregation. Specifically, on the bottom right portion of the map-based graphics section, a user can click on "DMA", which stands for designated market area. FIG. 3C illustrates a resulting example report. Each designated market area can correspond to a city or group of cities. Designated market areas can have a strictly geographical definition and/or functional definition, such as an area in which Seattle-based television is watched. Designated market areas may be predefined and may be predefined at different levels. For example, a first set of designated market areas can be defined for the United States and second sets can be defined for each individual state (e.g., each including a county or set of counties).

The graphics section of the report of FIG. 3C shows dots representing each DMA with sizable contributions to the total views. It further emphasizes the representation of the DMA with the most views, which is Seattle-Tacoma, Wash. in this instance.

It will be appreciated that the example reports shown in FIGS. 3A-3C are mere examples of geographic reports. Geographic reports can further be discretized based on cities, providences, counties, etc.

Figure 3D:
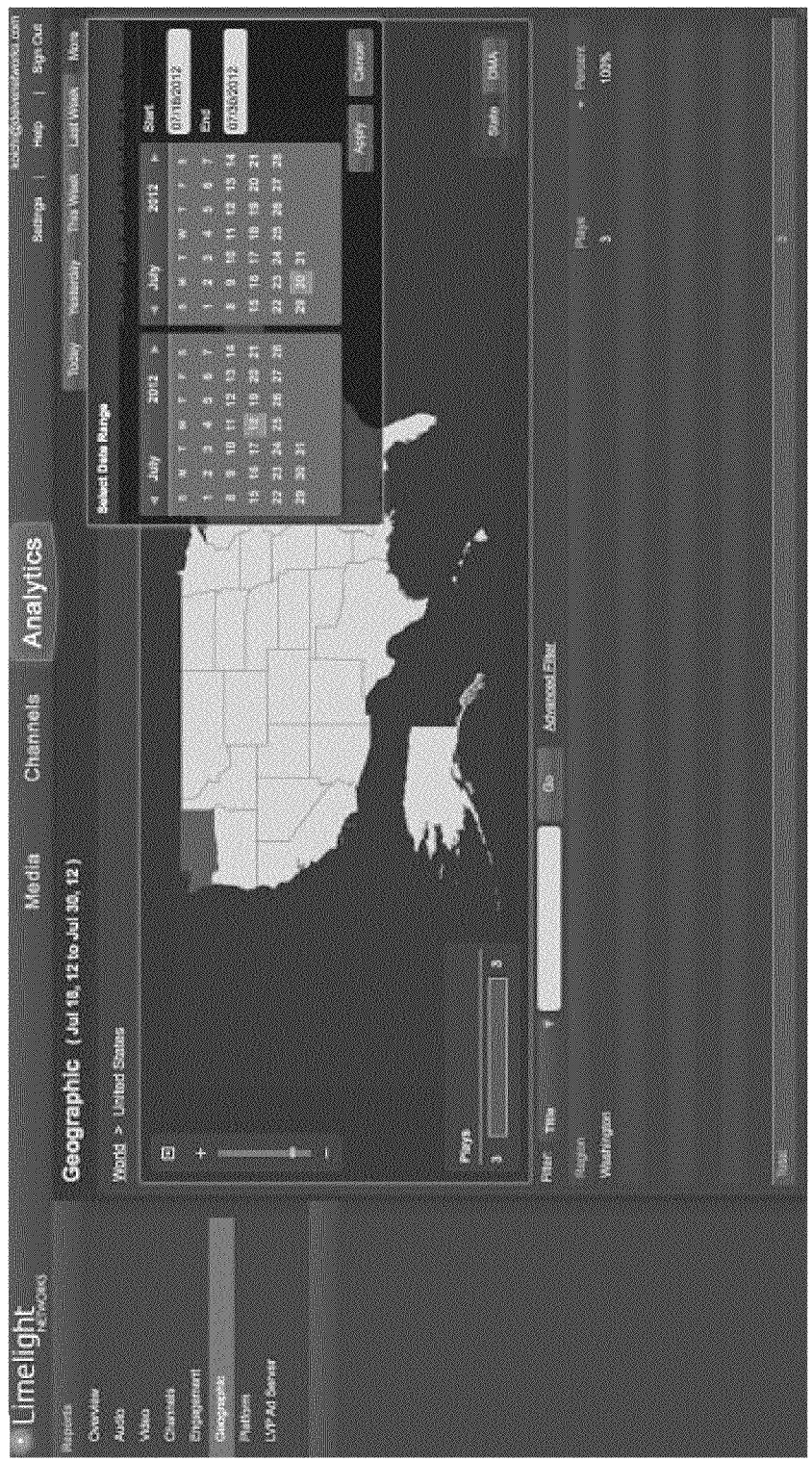

A user can further interact with a report to further filter the presented data. For example, as shown in FIG. 3D, a user can restrict the viewing dates. In this instance, a user has selected a date range of Jul. 18-30, 2012. When viewing the report at a state level, the only state in the United States associated with visitors in this date range was Washington. While date ranges are presented, it will be appreciated that a user could filter the data using other available log fields, such as view time, user agents, or user devices. Upon detecting the user's filter indication, the log aggregator 228 can search for logs satisfying an associated criterion and appropriately analyze the logs (e.g., counting the search results or counting the search results that meet each of other criteria).

Figure 4A:
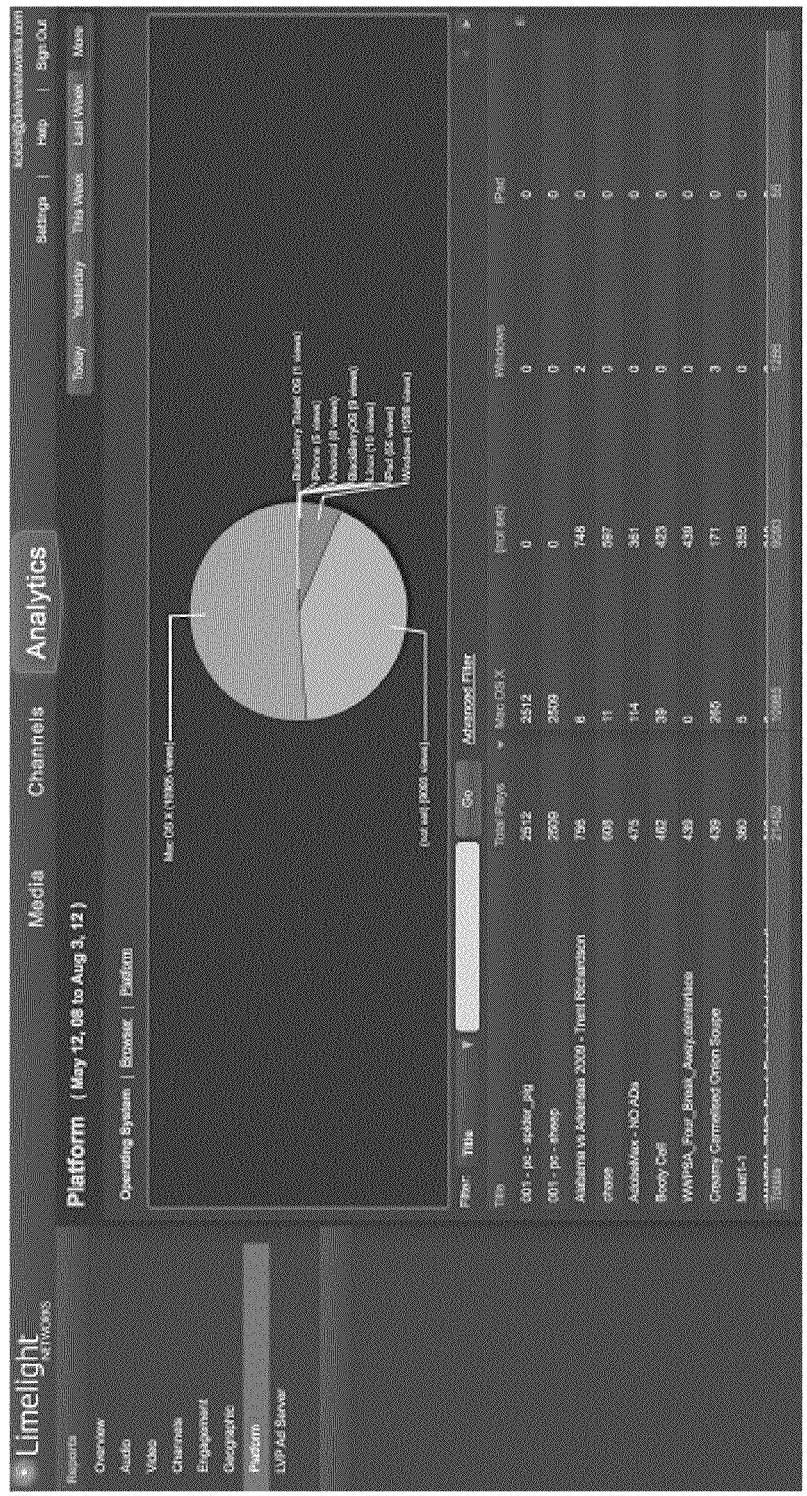
FIGS. 4A-4C illustrate dynamic reports generated by a report request manager.
Figure 4B:
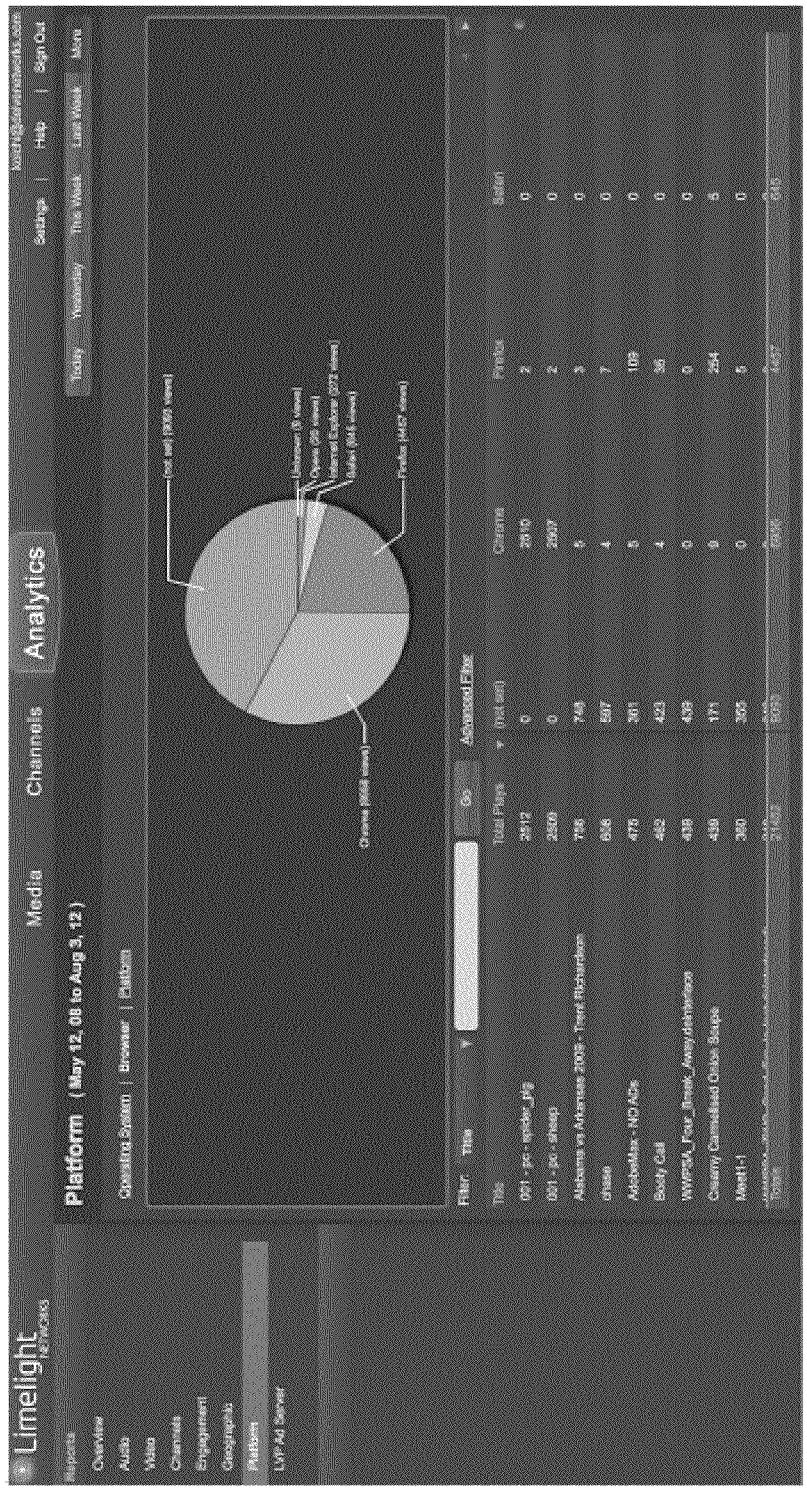
Figure 4C:

Referring next to FIGS. 4A-4C, examples of presentations of a dynamic report 200 generated by report request manager 152 are shown. In these instances, data is grouped based on visitors' operating system, browser or platform. In each instance, the data aggregated for the report corresponds to all content objects associated with a single content provider. The top section of each report collectively analyzes the views across content objects and represents the distribution across operating systems, browsers or platforms as a pie graph. The bottom section of each report shows numerical, absolute values across the operating systems, browsers or platforms for each content object associated with the content provider.

For example, in FIG. 4A, most visitors accessing any content object associated with the given content provider used a Mac OS X operating system. Meanwhile, for some particular content objects, visitors associated with unset (or unidentifiable) operating systems were more prevalent than visitors with the Mac OS X. In FIG. 4B, amongst the users with identifiable browsers, most visitors used Chrome, followed by Firefox, and then by Safari. Meanwhile, this trend again differed depending on whether the content objects were collectively analyzed or individually analyzed. With regard to platform, as shown in FIG. 4C, nearly all visitors used Flash, with a small percentage using HTML5 or 3GP.

A content provider with access to this type of report data can use the information to determine which types of content to offer. For example, the content provider may decide to optimize web pages based primarily on the Mac OS X operating system and Chrome browser and to have little hesitation about using Flash.

To present this data, the report request manager 152 can collect all logs for the given content provider. The log aggregator 228 can then group the logs based on the operating systems, browsers or platforms. The aggregation can be performed dynamically (e.g., after receiving a user indication or a request to view the data segregated as such) or in advance. For example, the log aggregator 228 can group the logs separately for each of the three factors and the appropriate grouping can be presented based on a user's selection. As before, the user can further interact with the data to filter the results to constrain parameters of other fields. The aggregation and presentation can thereafter be appropriately adjusted.

Figure 5A:
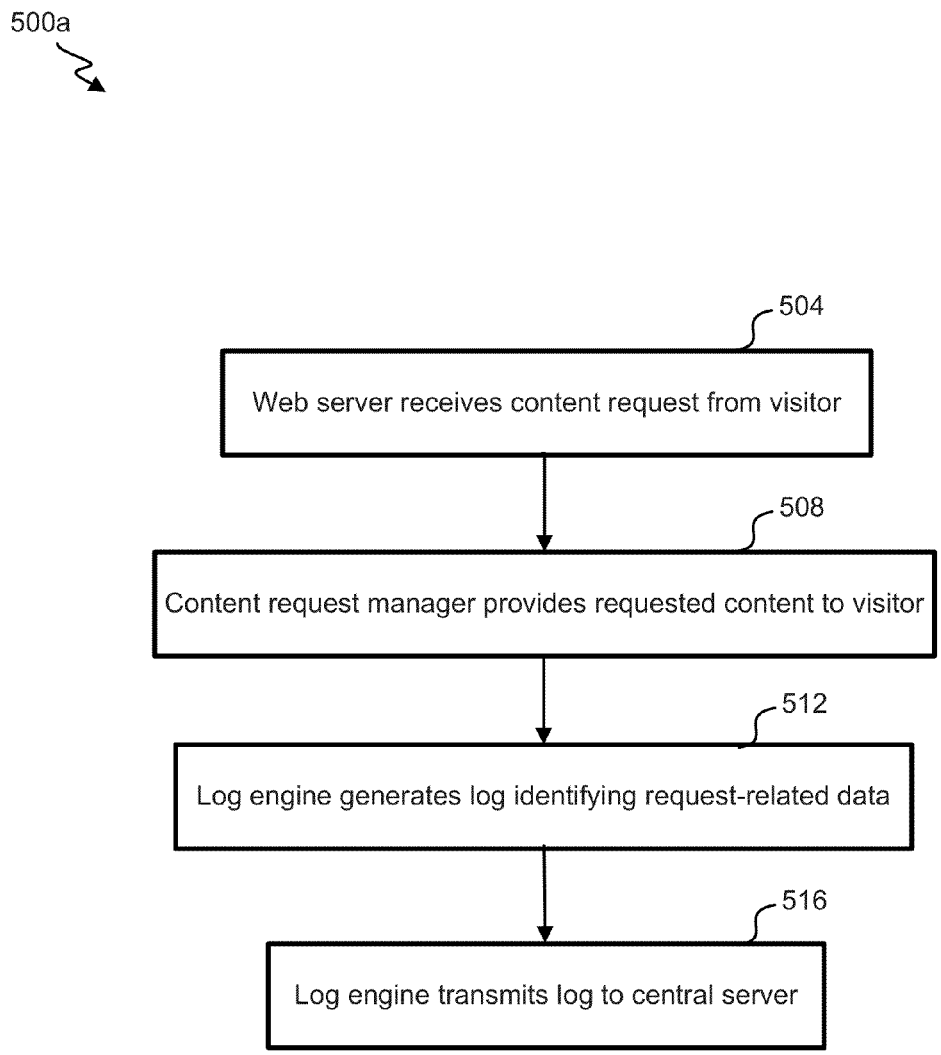
FIGS. 5A-5B illustrate flowcharts of embodiments of processes for responding to a content request.

With reference to FIG. 5A, a flowchart of an embodiment of a process 500a for responding to a content request is shown. The depicted portion of the process 500a begins in block 504 where a web server 104 receives content request from a visitor 132. The content request can include, e.g., a request for a webpage, a request for a content object presented via the webpage, or a request for a file for download. For example, the content request can include a request for a video and/or audio file. The request can be received over a network, such as over the Internet. The request can be routed to the web server via a content delivery network. The web server can be a primary host of the content or can be a secondary host (e.g., an edge server) storing a copy of the content. In some instances, the web server does not itself store the content.

A content request manager 116 of the web server 104 provides the requested content to visitor 132 at block 508. In some instances, block 508 further includes searching locally for the content and/or retrieving the content from another server. The requested content can be provided by presenting the content over a webpage, presenting the content as or within a webpage or providing a download of the content.

A log engine 120 of the web server 104 generates a visitor log identifying request-related data at block 512. The visitor log can include an indication of the requested content, a date and/or time of the request, information about who and/or what is requesting the content (e.g., a user name, user device, IP address, etc.) and/or user-agent information (e.g., a browser, platform, operating system, etc.). The log can further include data collected after the content is provided to the visitor 132. This data can include, e.g., how long the visitor 132 stayed on a webpage providing the content or on a requested webpage and/or how the visitor interacted with the requested content (e.g., whether the visitor watched an entire movie or skipped parts of it).

The log engine 120 transmits the visitor log to a central server 136 at block 516. The log can be transmitted immediately or shortly following its generation or after a request is received from the central server 136 for the log. In some instances, sets of logs are transmitted to the central server 136 at regular intervals (e.g., every hour, 30 minutes, 15 minutes, etc.) or upon satisfying a criterion (e.g., having a threshold number of logs generated, generally or for a specific content object, since a last transmission).

Figure 5B:
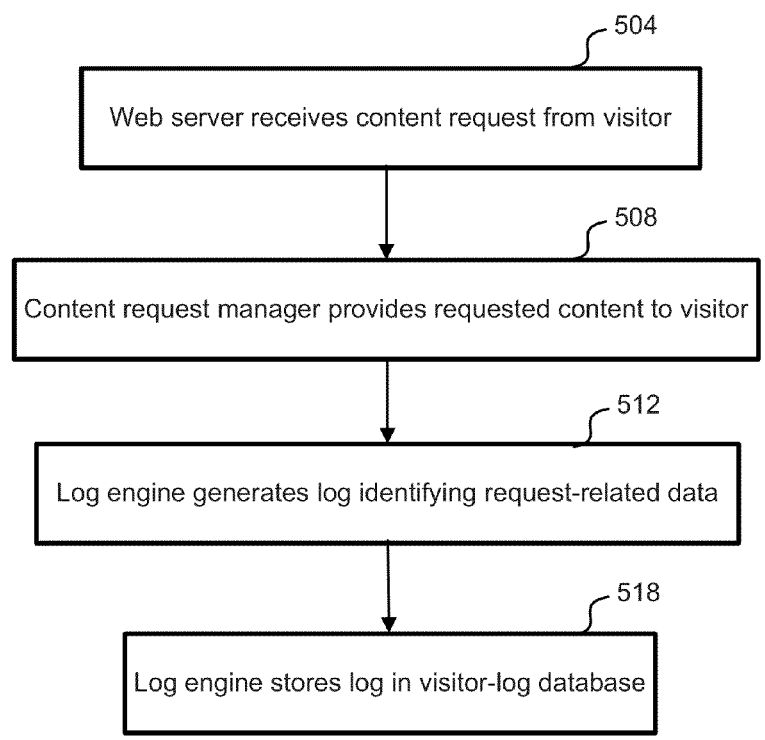

With reference to FIG. 5B, a flowchart of an embodiment of a process 500b for responding to a content request is shown. Blocks 504-512 are the same as those depicted in FIG. 5A with respect to process 500a. However, in process 500b, the log engine 120 stores the visitor log in a local visitor-log database 124 at block 518. The local storing can be as an alternative or in addition to the transmission shown in block 516 of process 500a.

Figure 6:
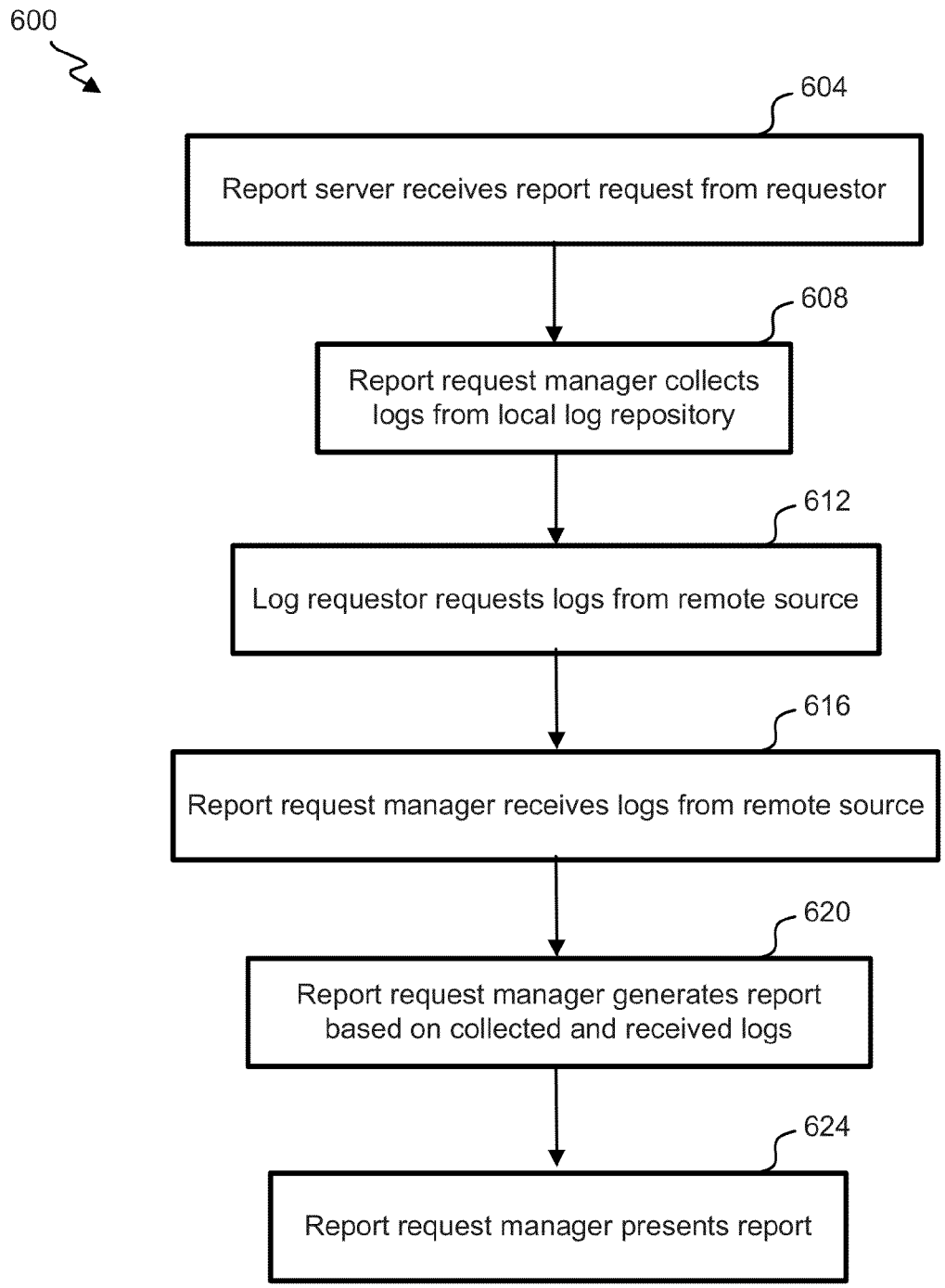
FIG. 6 illustrates a flowchart of an embodiment of a process for generating a report.

With reference to FIG. 6, a flowchart of an embodiment of a process 600 for generating a report is shown. The depicted portion of the process 600 begins in block 604 where a report server 148 receives a report request from a requestor 176. The report request can explicitly or implicitly identify one or more content objects (e.g., implicating identifying a set of content objects by identifying a content provider associated with each content object in the set). The report request can further identify fields of interest, parameter restraints, desired discretizations, and/or desired report formatting.

A report request manager 152 of the report server 148 collects logs pertinent to the request from local log repository 160 at block 608. For example, the report request manager 152 can identify pertinent fields to search and parameters to use within the search (e.g., parameter thresholds, parameter ranges, parameter lists, etc.). The fields and parameters can include all fields and parameters that would be relevant to a request or a subset. For example, a request can indicate that a report should relate to visits from Oct. 1, 2012-Oct. 8, 2012 for Content A. Meanwhile, the report request manager 152 may determine that the local log repository 160 was last updated on Oct. 6, 2012. Thus, the report request manager 152 can identify a date field and a parameter range of Oct. 1, 2012-Oct. 6, 2012.

The identified fields and parameters can be transmitted to the local log repository 160, which searches for logs responsive to the search. In some instances, the report request manager 152 tracks properties of logs stored within the local log repository 160 (e.g., in a repository-log identifiers database 220). Thus, the report request manager 152 can itself identify logs pertinent to the request and can request specific logs (e.g., by using unique log identifiers).

A log requestor 156 of the report server 148 requests logs from a remote source at block 612. The remote source can include, e.g., the central server 136 or web server 104. The request can be made via a single request or multiple requests (e.g., to multiple web servers), such as a multicast request. The log requestor 156 can include in its request pertinent fields to search and parameters to use within the search (e.g., parameter thresholds, parameter ranges, parameter lists, etc.). The pertinent fields and parameters can be the same or different from those used in the collection of logs from the local log repository 160.

In a first instance, logs are collected from the local log repository 160 using all pertinent fields and parameters, and logs are requested from the remote source using a subset of the pertinent fields and parameters. For example, the report request manager 152 can determine that no reports were returned from the local log repository 160 with parameters within a particular range, and this range can thereafter be identified in the request to the remote source. In a second instance, logs are collected from the local log repository using a first subset of pertinent fields and parameters, and logs are requested from the remote source using a second subset of the pertinent fields and parameters. The first and second subsets can be different and can be overlapping or non-overlapping. Non-overlapping subsets can increase efficiency, though overlapping subsets can decrease the probability of missing logs. For example, the report request manager 152 can track past searches precipitating population of the local log repository 160 (and/or can track logs deleted from the repository). The report request manager 152 can then request logs meeting these past criteria from the repository (and/or not deleted from the repository), and the log requestor 156 can request logs from the remote source not likely to be in the repository based on this tracked data.

The report request manager 152 receives logs from the remote source at block 616 and generates a report based on collected and received logs at block 620. Generating the report can include aggregating data across the logs, e.g., to show counts (e.g., a number of visitors) or to show percentages (e.g., a portion of visitors within a given geographical region). The generated report can be configured to allow for the requestor 176 top interact with the report. The report request manager 152 presents the report at block 624.

Figure 7:
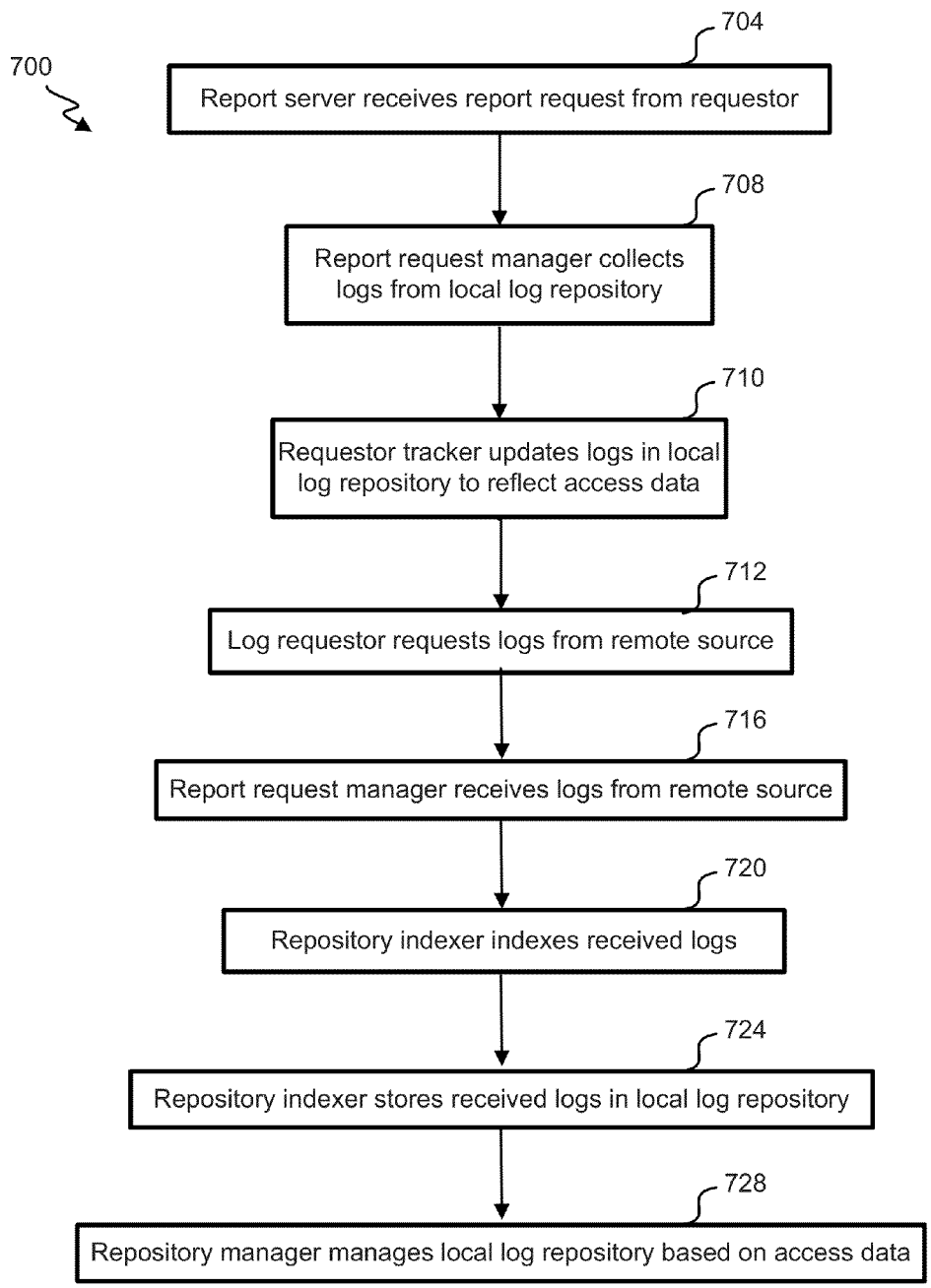
FIG. 7 illustrates a flowchart of an embodiment of a process for managing a local log repository.

With reference to FIG. 7, a flowchart of an embodiment of a process 700 for managing a local log repository 160 is shown. Blocks 704, 708, 712 and 716 parallel similarly numbered blocks in process 600. In process 700, a requestor tracker 216 of the report request manager 152 updates collected visitor logs in local log repository 160 to indicate access to the logs at block 710. For example, logs in local log repository 160 can be indexed to include one or more access fields, such as one or more dates of access (e.g., a most recent access date) and/or a count of accesses. Parameters in the fields can be updated before, after or while the logs are being collected.

Process 700 also shows how the local log repository 160 can be populated. A repository indexer 164 indexes logs received from a remote source at block 720. The indexing can be performed to ensure that the logs in the local log repository 160 include desired fields. This can include removing, modifying and/or adding fields. The remaining fields can include those used to search for logs pertinent to a report request or those used to manage the local log repository. For example, one or more access fields or source fields (indicating which server provided the logs) can be added to the logs. As fields are added, the repository indexer 164 can further provide parameters for the fields (e.g., identifying a current access date or initiating an access count). The repository indexer 164 can delete fields if requestors 176 are unable to request reports associated with parameter constraints of the field or if this ability is seldom used in practice by requestors 176.

The repository indexer 164 stores received and indexed logs in the local log repository 160 at block 724. The indexed and/or stored logs can include all logs received from one, more or all remote sources or a subset of the received logs. For example, the repository indexer 164 may only index and store logs associated with content providers having high quality-of-service services.

The repository manager 168 manages the local log repository 160 based on past or predicted access data at block 728. The management can include deleting logs from the local log repository or removing, modifying and/or adding fields. The management can be performed periodically or upon detecting that a criterion has been satisfied (e.g., that a size of the repository has crossed a threshold). The repository manager 168 can delete logs that haven't been used recently, haven't been used frequently, or aren't likely to be used in the future based on an analysis of access trends.\

Figure 8:
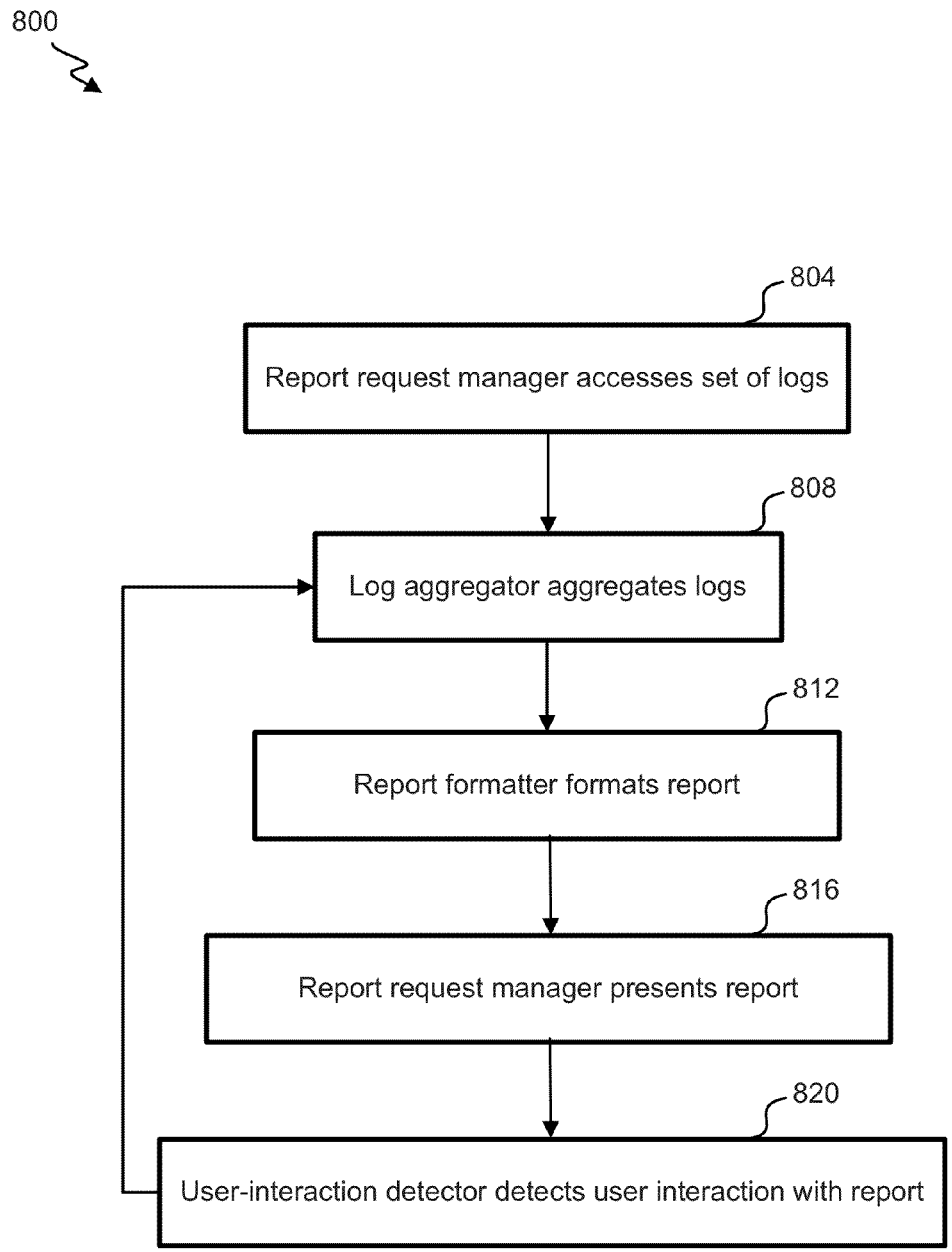
FIG. 8 illustrates a flowchart of an embodiment of a process for presenting a dynamic report.

With reference to FIG. 8, a flowchart of an embodiment of a process 800 for presenting a dynamic report is shown. The depicted portion of the process 800 begins in block 804 where a report request manager 152 accesses set of logs. The logs can include logs collected from the local log repository 160 and/or received from one or more remote sources. A log aggregator 228 aggregates the logs. The aggregation can involve counting logs with particular parameters (or parameters within a range or set), determining a statistic based on a set of parameters (e.g., a median, mean or mode), normalizing a value (e.g., normalizing a count of logs meeting a criterion by a total count of logs accessed), generating a distribution, etc.

A report formatter 232 formats a report at block 812. The formatted report can present the aggregated data (e.g., graphically or textually). For example, the formatted report can include a pie graph, a bar graph, a line graph, or a colored map. The report can further be formatted to allow for a user to interact with the report.

The report request manager 152 presents the report at block 816. The report can be presented via a website or by transmitting the report (e.g., via a download or email) to a requestor 176. A user-interaction detector 204 detects user interaction with the report (e.g., a requestor 176 interacting with the report). The interaction can include adjusting a value along a scale (e.g., a discretization scale), identifying a field of interest for discretization, filtering displayed data using parameters of a field, etc.

Following the detection, one or more of blocks 808-816 are again performed. For example, the logs (or a subset thereof identified based on the user interaction) can be re-aggregated and/or the report can be reformatted.

Figure 9:
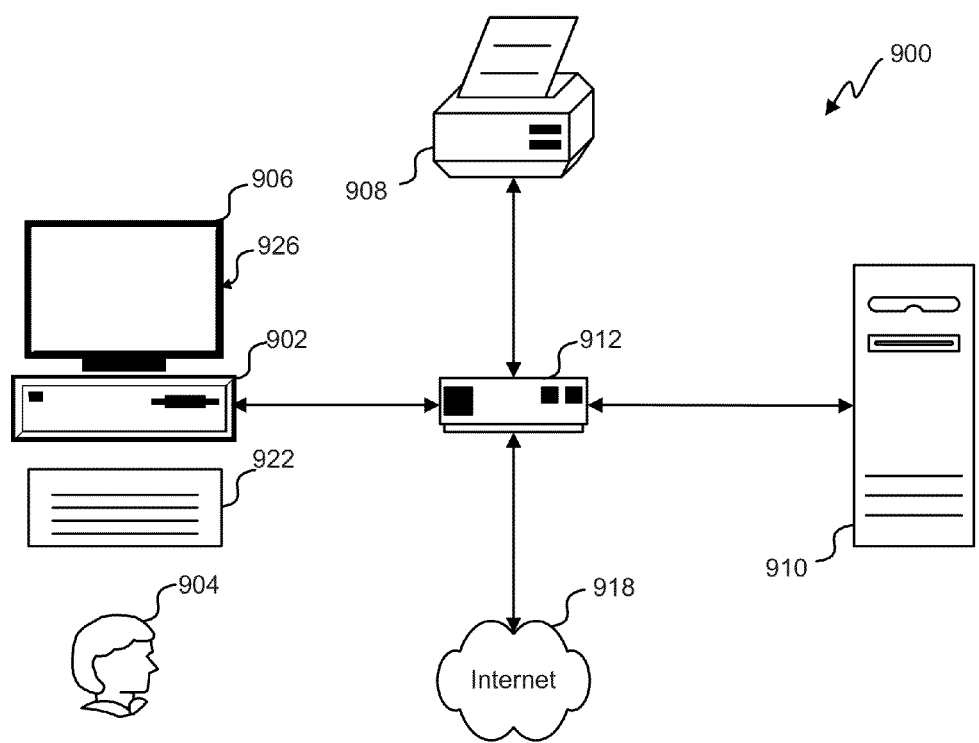
FIG. 9 depicts a block diagram of an embodiment of a computer system.

Referring next to FIG. 9, an exemplary environment with which embodiments may be implemented is shown with a computer system 900 that can be used by a designer 904 to design, for example, electronic designs. The computer system 900 can include a computer 902, keyboard 922, a network router 912, a printer 908, and a monitor 906. The monitor 906, processor 902 and keyboard 922 are part of a computer system 926, which can be a laptop computer, desktop computer, handheld computer, mainframe computer, etc. The monitor 906 can be a CRT, flat screen, etc.

A designer 904 can input commands into the computer 902 using various input devices, such as a mouse, keyboard 922, track ball, touch screen, etc. If the computer system 900 comprises a mainframe, a designer 904 can access the computer 902 using, for example, a terminal or terminal interface. Additionally, the computer system 926 may be connected to a printer 908 and a server 910 using a network router 912, which may connect to the Internet 918 or a WAN.

The server 910 may, for example, be used to store additional software programs and data. In one embodiment, software implementing the systems and methods described herein can be stored on a storage medium in the server 910. Thus, the software can be run from the storage medium in the server 910. In another embodiment, software implementing the systems and methods described herein can be stored on a storage medium in the computer 902. Thus, the software can be run from the storage medium in the computer system 926. Therefore, in this embodiment, the software can be used whether or not computer 902 is connected to network router 912. Printer 908 may be connected directly to computer 902, in which case, the computer system 926 can print whether or not it is connected to network router 912.

Figure 10:
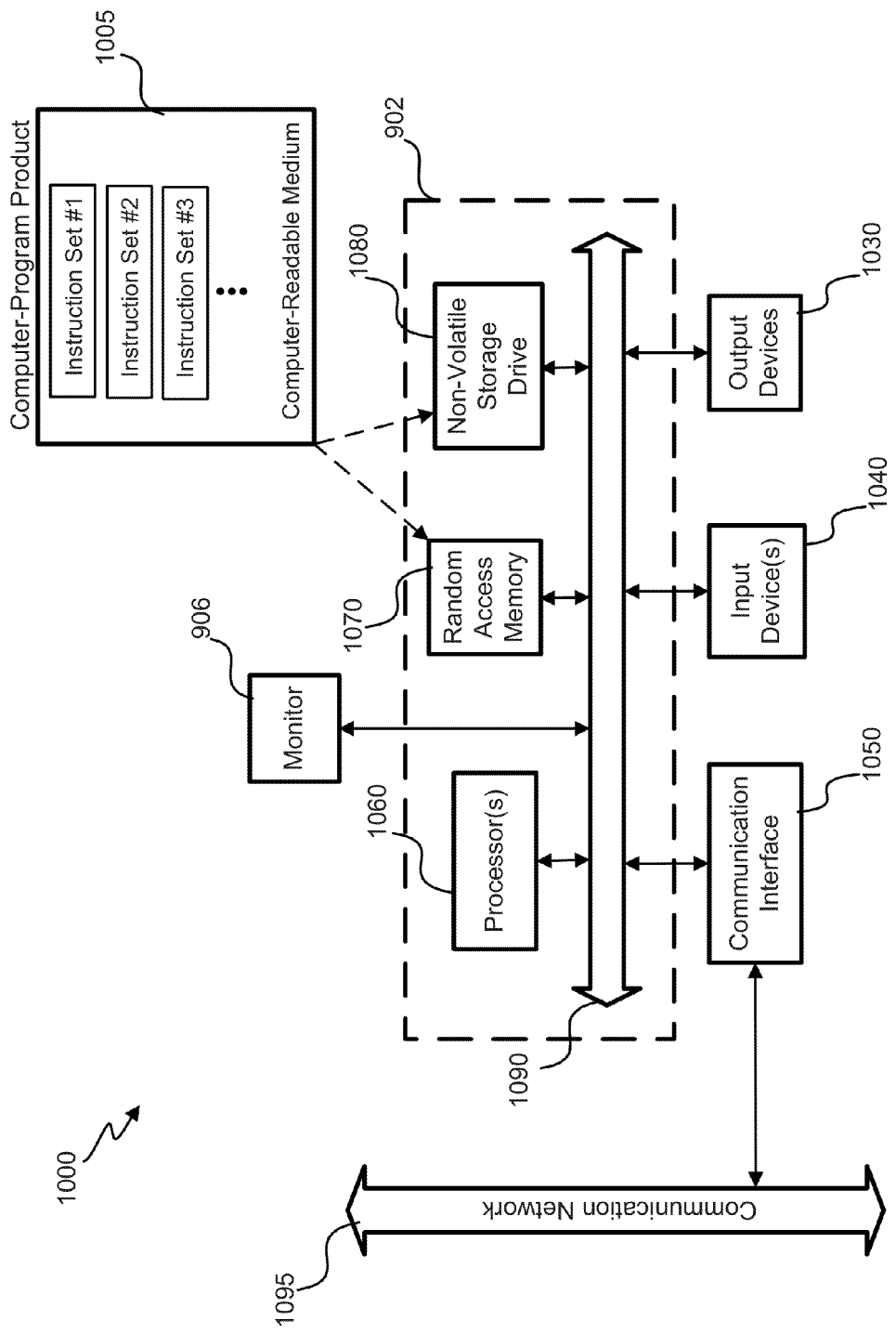
FIG. 10 depicts a block diagram of an embodiment of a special-purpose computer system.

With reference to FIG. 10, an embodiment of a special-purpose computer system 1000 is shown. The web server 104, central server 36, and report server 148 are examples of a special-purpose computer system 1000. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 926, it is transformed into the special-purpose computer system 1000.

Special-purpose computer system 1000 comprises a computer 902, a monitor 906 coupled to computer 902, one or more additional user output devices 1030 (optional) coupled to computer 902, one or more user input devices 1040 (e.g., keyboard, mouse, track ball, touch screen) coupled to computer 902, an optional communications interface 1050 coupled to computer 902, a computer-program product 1005 stored in a tangible computer-readable memory in computer 902. Computer-program product 1005 directs system 1000 to perform the above-described methods. Computer 902 may include one or more processors 1060 that communicate with a number of peripheral devices via a bus subsystem 1090. These peripheral devices may include user output device(s) 1030, user input device(s) 1040, communications interface 1050, and a storage subsystem, such as random access memory (RAM) 1070 and non-volatile storage drive 1080 (e.g., disk drive, optical drive, solid state drive), which are forms of tangible computer-readable memory.

Computer-program product 1005 may be stored in non-volatile storage drive 1090 or another computer-readable medium accessible to computer 902 and loaded into memory 1070. Each processor 1060 may comprise a microprocessor, such as a microprocessor from Intel® or Advanced Micro Devices, Inc.®, or the like. To support computer-program product 1005, the computer 902 runs an operating system that handles the communications of product 1005 with the above-noted components, as well as the communications between the above-noted components in support of the computer-program product 1005. Exemplary operating systems include Windows® or the like from Microsoft Corporation, Solaris® from Sun Microsystems, LINUX, UNIX, and the like.

User input devices 1040 include all possible types of devices and mechanisms to input information to computer system 902. These may include a keyboard, a keypad, a mouse, a scanner, a digital drawing pad, a touch screen incorporated into the display, audio input devices such as voice recognition systems, microphones, and other types of input devices. In various embodiments, user input devices 1040 are typically embodied as a computer mouse, a trackball, a track pad, a joystick, wireless remote, a drawing tablet, a voice command system. User input devices 1040 typically allow a user to select objects, icons, text and the like that appear on the monitor 906 via a command such as a click of a button or the like. User output devices 1030 include all possible types of devices and mechanisms to output information from computer 902. These may include a display (e.g., monitor 906), printers, non-visual displays such as audio output devices, etc.

Communications interface 1050 provides an interface to other communication networks and devices and may serve as an interface to receive data from and transmit data to other systems, WANs and/or the Internet 918. Embodiments of communications interface 1050 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1050 may be coupled to a computer network, to a FireWire® bus, or the like. In other embodiments, communications interface 1050 may be physically integrated on the motherboard of computer 902, and/or may be a software program, or the like.

RAM 1070 and non-volatile storage drive 1080 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1070 and non-volatile storage drive 1080 may be configured to store the basic programming and data constructs that provide the functionality of various embodiments of the present invention, as described above.

Software instruction sets that provide the functionality of the present invention may be stored in RAM 1070 and non-volatile storage drive 1080. These instruction sets or code may be executed by the processor(s) 1060. RAM 1070 and non-volatile storage drive 1080 may also provide a repository to store data and data structures used in accordance with the present invention. RAM 1070 and non-volatile storage drive 1080 may include a number of memories including a main random access memory (RAM) to store of instructions and data during program execution and a read-only memory (ROM) in which fixed instructions are stored. RAM 1070 and non-volatile storage drive 1080 may include a file storage subsystem providing persistent (non-volatile) storage of program and/or data files. RAM 1070 and non-volatile storage drive 1080 may also include removable storage systems, such as removable flash memory.

Bus subsystem 1090 provides a mechanism to allow the various components and subsystems of computer 902 communicate with each other as intended. Although bus subsystem 1090 is shown schematically as a single bus, alternative embodiments of the bus subsystem may utilize multiple busses or communication paths within the computer 902.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for tracking visitors' access to web content using a searchable and size-constrained local log repository, the system comprising:
    one or more processors;
    a repository indexer, using the one or more processors, that receives visitor logs from a remote source and indexes the received visitor logs to include a usage field, each visitor log indicating a content object requested by a visitor and a date, the usage field indicating at least one of when or how frequently an associated visitor log was accessed from a local log repository by a report request manager;
    the local log repository, the local log repository storing in memory the visitor logs received and indexed by the repository indexer and the local log repository being size constrained;
    a repository manager, using the one or more processors, that removes a subset of the visitor logs in the local log repository based on parameters within the subset of the visitor logs' usage field; and
    the report request manager, using the one or more processors, wherein the report request manager:
        receives a request from a requestor for a report indicating visitors' access to a content object,
        searches for visitor logs within the local log repository pertinent to the request,
        aggregates data across the visitor logs responsive to the search, and generates a report presenting the aggregated data.

2. The system for tracking visitors' access to web content using the searchable and size-constrained local log repository as recited in claim 1, wherein the report request manager further initiates a collection of visitor logs from the remote source, and wherein the aggregation includes aggregating data a set of visitor logs, the set of visitor logs including the visitor logs responsive to the search and the visitor logs collected from the remote source.

3. The system for tracking visitors' access to web content using the searchable and size-constrained local log repository as recited in claim 1, wherein the repository indexer receives the visitor logs from the remote source subsequent to receipt by the report request manager of a first request pertaining to the visitor logs, and wherein the request from the requestor is received subsequent to the receiving of the first request.

4. The system for tracking visitors' access to web content using the searchable and size-constrained local log repository as recited in claim 1, wherein the remote source comprises a central server, the central server comprising a central log repository storing visitor logs supplied by a plurality of web servers.

5. The system for tracking visitors' access to web content using the searchable and size-constrained local log repository as recited in claim 1, wherein the report request manager further tracks parameters associated with requests precipitating receipt by the repository indexer of the visitor logs from the remote source.

6. The system for tracking visitors' access to web content using the searchable and size-constrained local log repository as recited in claim 1, wherein the generated report comprises a dynamic report that allows the requestor to interact with the report, wherein data presented in the report changes as a result of the interaction.

7. The system for tracking visitors' access to web content using the searchable and size-constrained local log repository as recited in claim 1, wherein the generated report indicates a geographical distribution of visitors accessing the content object.

8. A method for tracking visitors' access to web content using a searchable and size-constrained local log repository, the method comprising:
    receiving visitor logs from a remote source, each visitor log indicating a content object accessed by a visitor and a date;
    indexing the received visitor logs to include a usage field, the usage field indicating at least one of when or how frequently an associated visitor log was accessed from a local log repository;
    storing the indexed visitor logs in the local log repository, the local log repository being size constrained;
    receiving a request from a requestor for a report indicating visitors' access to a content object;
    searching for visitor logs within the local log repository to the request;
    aggregating data across the visitor logs responsive to the search;

updating parameters within the usage field of the visitor logs responsive to the search to indicate that the logs were accessed;

generating a report presenting the aggregated data; and removing a subset of the visitor logs in the local log repository based on parameters within the subset of the visitor logs' usage field.

9. The method for tracking visitors' access to web content using the searchable and size-constrained local log repository as recited in claim 8, wherein the usage field indicates a number of times that the associated visitor log was accessed from the local log repository.

10. The method for tracking visitors' access to web content using the searchable and size-constrained local log repository as recited in claim 8, wherein the usage field indicates a date and time at which the associated visitor log was accessed from the local log repository.

11. The method for tracking visitors' access to web content using the searchable and size-constrained local log repository as recited in claim 8, the method further comprising:

requesting other visitor logs pertinent to the request from a remote source.

12. The method for tracking visitors' access to web content using the searchable and size-constrained local log repository as recited in claim 8, wherein the generated report indicates a distribution of user agents associated with visitors' access to the content object.

13. The method for tracking visitors' access to web content using the searchable and size-constrained local log repository as recited in claim 8, wherein the subset of visitor logs are removed from the local log repository after detecting that a size of the local log repository has exceeded a threshold.

14. The method for tracking visitors' access to web content using the searchable and size-constrained local log repository as recited in claim 8, further comprising:

detecting that the visitor has interacted with the report; and adjusting the report to present a new aggregation of the data of at least some of the visitor logs responsive to the search.

15. A method for tracking visitors' access to web content using a searchable and size-constrained local log repository, the method comprising:

receiving visitor logs from a remote source, each visitor log indicating a content object accessed by a visitor and a date;

indexing the received visitor logs to add, remove or modify a field of the visitor logs;

storing the indexed visitor logs in a local log repository, the local log repository being size-constrained;

receiving a request from a requestor for a report indicating visitors' access to a content object;

searching for visitor logs within the local log repository pertinent to the request;

aggregating data across the visitor logs responsive to the search;

generating a report presenting the aggregated data; and removing a subset of the visitor logs in the local log repository.

16. The method for tracking visitors' access to web content using the searchable and size-constrained local log repository as recited in claim 15, wherein the received visitor logs are indexed to add a usage field, the usage field indicating a when or how frequently an associated visitor log was accessed from the local log repository.

17. The method for tracking visitors' access to web content using the searchable and size-constrained local log repository as recited in claim 15, wherein the generated report comprises a dynamic report that allows the requestor to interact with the report, wherein data presented in the report changes as a result of the interaction.

18. The method for tracking visitors' access to web content using the searchable and size-constrained local log repository as recited in claim 15, wherein the generated report indicates a geographical distribution of visitors accessing the content object, and wherein the visitor can dynamically interact with the report to set a geographical discretization of the distribution.

19. The method for tracking visitors' access to web content using the searchable and size-constrained local log repository as recited in claim 15, wherein the request identifies a content provider and the content object is associated with the content provider.

20. The method for tracking visitors' access to web content using the searchable and size-constrained local log repository as recited in claim 15, the method further comprising:

requesting other visitor logs pertinent to the request from a remote source.

* * * * *